United States Patent
Kurashima (10) Patent No.: US 9,363,020 B2
(45) Date of Patent: Jun. 7, 2016

(54) OPTICAL TRANSCEIVER HAVING INNER FIBERS FOR COUPLING OPTICAL RECEPTACLE WITH TRANSMITTER AND RECEIVER MODULES

(71) Applicant: Sumitomo Electric Industries, Ltd., Osaka-shi (JP)

(72) Inventor: Hiromi Kurashima, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 1 day.

(21) Appl. No.: 14/485,503

(22) Filed: Sep. 12, 2014

(65) Prior Publication Data

US 2015/0078760 A1    Mar. 19, 2015

(30) Foreign Application Priority Data

Sep. 13, 2013   (JP) .................................. 2013-190520

(51) Int. Cl.
*H04B 10/40* (2013.01)
*H04B 10/80* (2013.01)
*G02B 6/42* (2006.01)

(52) U.S. Cl.
CPC .............. *H04B 10/40* (2013.01); *G02B 6/4246* (2013.01); *H04B 10/801* (2013.01); *G02B 6/428* (2013.01); *G02B 6/4268* (2013.01); *G02B 6/4284* (2013.01)

(58) Field of Classification Search
CPC ............................. H04B 10/40; G02B 6/4246
See application file for complete search history.

(56) References Cited

U.S. PATENT DOCUMENTS

| 7,785,020 | B2 | 8/2010 | Kim et al. | |
| 2006/0140554 | A1* | 6/2006 | Oki | G02B 6/4201 385/92 |
| 2012/0148201 | A1* | 6/2012 | Kondou | G02B 6/4245 385/92 |
| 2012/0237171 | A1* | 9/2012 | Oki | G02B 6/4292 385/78 |

FOREIGN PATENT DOCUMENTS

JP   2006-086433 A   3/2006

* cited by examiner

*Primary Examiner* — David Payne
*Assistant Examiner* — Casey Kretzer
(74) *Attorney, Agent, or Firm* — Venable LLP; Michael A. Sartori; Trent B. Ostler (57) ABSTRACT

An optical transceiver that implements an inner fiber to optically connect an optical receptacle with an optical module is disclosed. The optical module in a ceiling thereof forms a gap against a printed circuit board (PCB) electrically connected with the optical module by a flexible printed circuit (FPC) board. The inner fiber is extended in a gap formed between the PCB and the FPC, or between the FPC and the ceiling of the optical module.

13 Claims, 10 Drawing Sheets

OPTICAL TRANSCEIVER HAVING INNER FIBERS FOR COUPLING OPTICAL RECEPTACLE WITH TRANSMITTER AND RECEIVER MODULES

TECHNICAL FIELD

The present application relates to an optical transceiver, in particular, an optical transceiver having inner fibers for coupling optical receptacle with a transmitter optical module and a receiver optical module.

BACKGROUND

An optical transceiver generally installs a transmitter optical module to convert an electrical signal to an outgoing optical signal output from a transmitter optical receptacle as an outgoing signal, and a receiver optical module to convert an incoming optical signal provided from a receiver optical receptacle to an electrical signal. One type of optical transceivers has a feature that the transmitter optical module and the receiver optical module implement the transmitter optical receptacle and the receiver optical receptacle, respectively. A Japanese Patent application laid open No. 2006-086433A has disclosed such an optical transceiver.

However, recent optical transceivers enhance the function implemented therein, which resultantly enlarges the size of the transmitter and receiver optical modules. Enlarged modules inevitably narrow a space between the modules, and a span between two fibers sometimes exceeds a standard for the two-wired optical connector. A U.S. Pat. No. 7,785,020, has proposed a technique to couple two modules with the optical connector by inner fibers.

Moreover, as the optical transceiver reduces the dimensions thereof, the inner fiber connecting the modules with the optical connector is required to satisfy the limitation of the fiber bent loss. An optical fiber is limited in the curvature thereof at a bent from the view point of the optical loss and the long term reliability.

SUMMARY

One aspect of the present application relates to an optical transceiver that provides an optical receptacle, an optical module, an inner fiber and a printed circuit board (PCB). The optical receptacle receives an external optical connector that secures an external fiber. The optical module, which installs an optical device, converts one of an optical signal and an electrical signal into another of the optical signal and the electrical signal. The inner fiber optically couples to the optical device in the optical module with the external fiber through the optical receptacle. The PCB mounts an electronic circuit that electrically couples with the optical module. A feature of the optical transceiver of the present application is that the PCB and the optical module form a space therebetween and the inner fiber extends within this space.

The optical module is connected to the PCB by a flexible printer circuit (FPC) board that is drawn from a center side wall of the optical module, extends along a ceiling of the module facing the PCB, wraparound in a peripheral edge of the PCB, and connected to the top surface of the PCB. The space to set the inner fiber is formed between the PCB and the FPC board, or between the FPC board and the ceiling. Although the ceiling of the optical module forms the space against the PCB to extend the inner fiber therein, the bottom opposite to the ceiling is directly in contact with the housing cover to enhance the heat dissipation.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION

Figure 1:
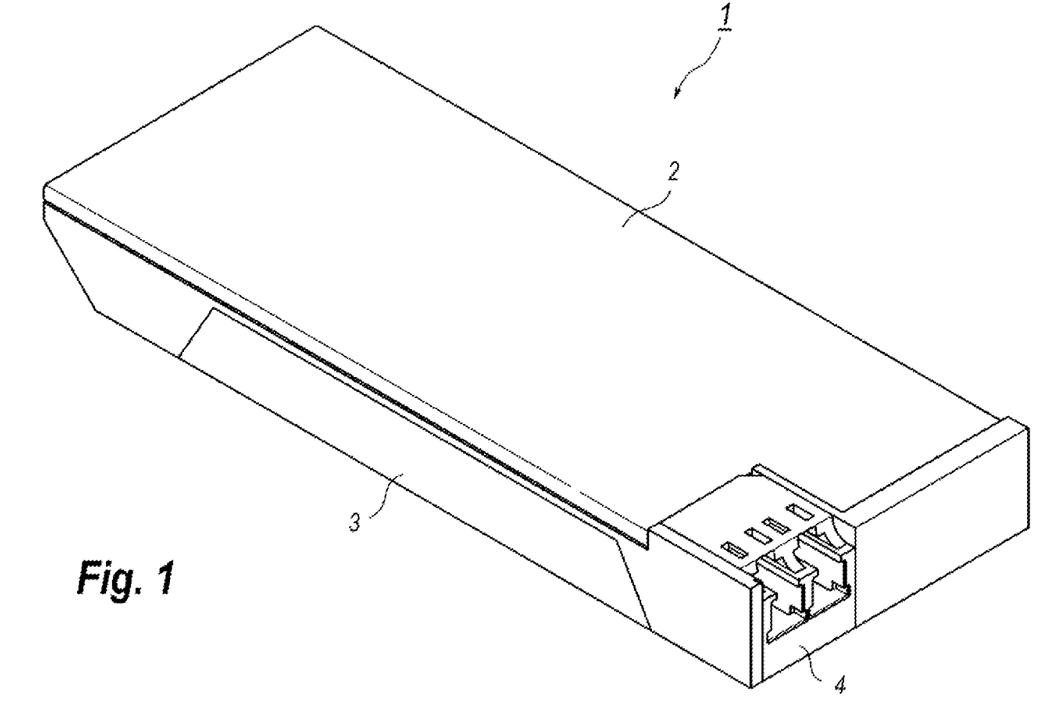
FIG. 1 shows an outer appearance of an optical transceiver according an example of the present application.

FIG. 1 shows an outer appearance of an optical transceiver according to an example of the present application, where FIG. 1 is viewed from the front bottom. The optical transceiver 1 shown in FIG. 1 provides a top housing 3 and a bottom housing 2 assembled with the top housing 3 by snap-fitting, screws, and so on. The top housing 3 further includes an optical receptacle 4 in a front portion thereof. The description below assumes that the front is a side where the optical receptacle 4 is provided; while, the rear is a side opposite to the front. Although FIG. 1 does not explicitly illustrate, the optical transceiver 1 provides an electrical plug in the rear to communicate with a host system. The bottom and top housings, 2 and 3, may be formed by die-casting of aluminum alloy, zinc alloy, and so on. While, the optical receptacle 4 may be also formed by the metal die-casting monolithically with the bottom housing, but may be formed of the injection molding of a resin independent of the housings.

Figure 2:
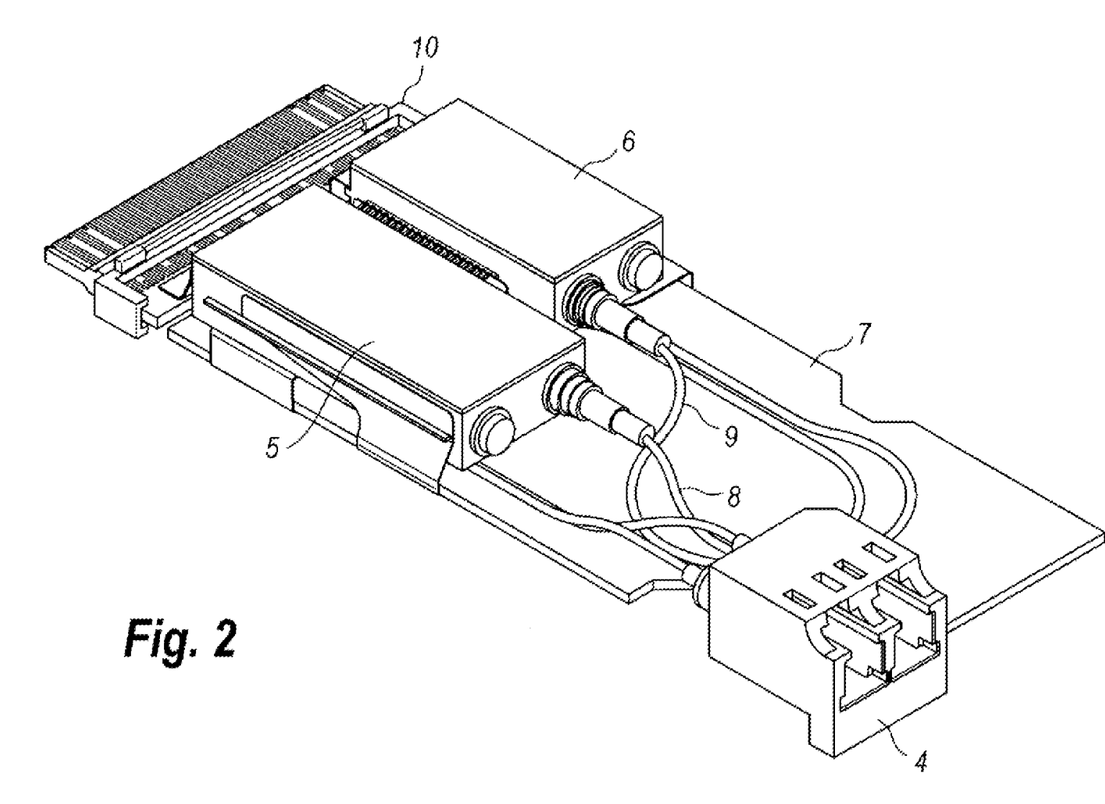
FIG. 2 shows primary components set in respective positions in the optical transceiver, where FIG. 2 views the inside of the optical transceiver from the front bottom.
Figure 3:
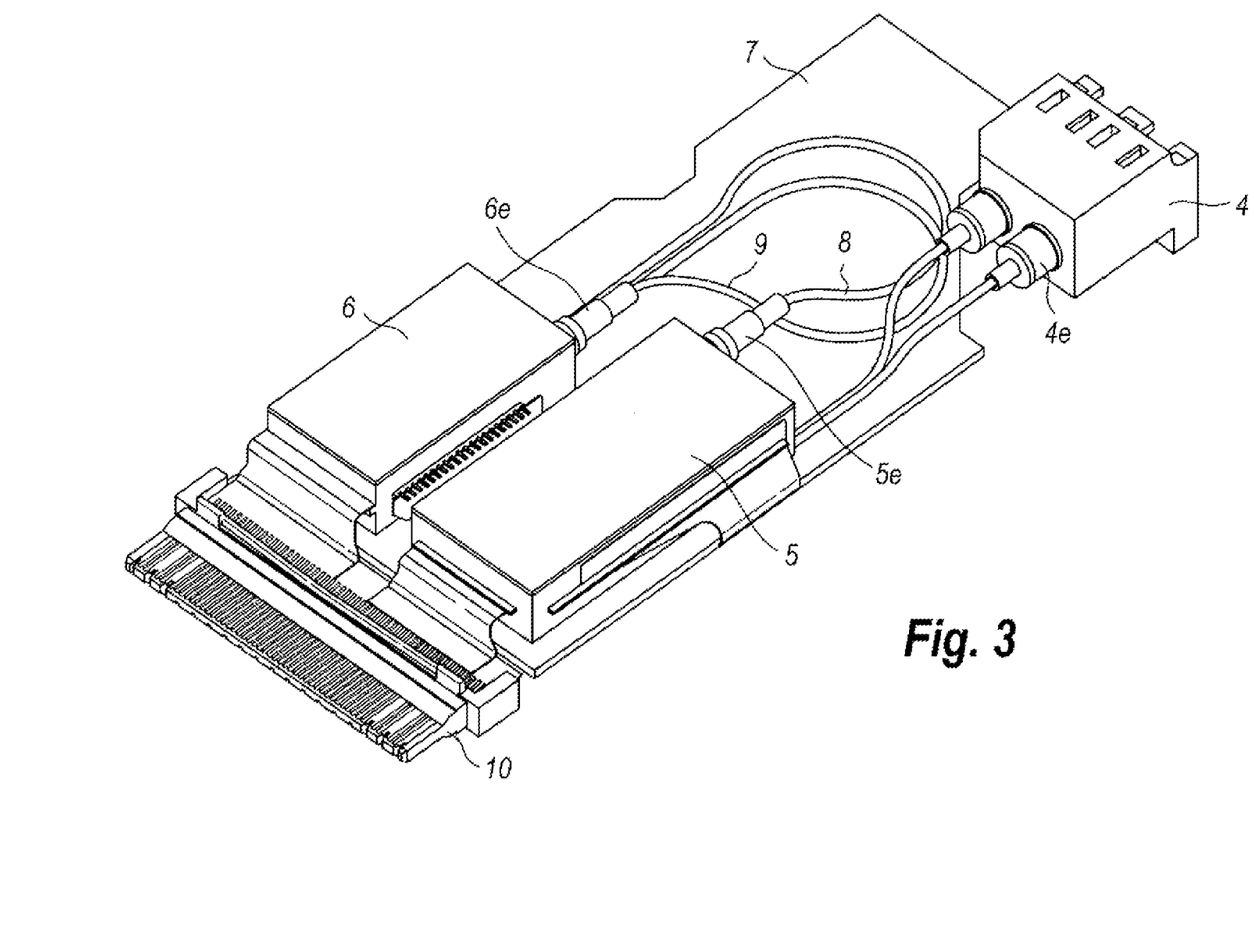
FIG. 3 shows the primary components in the optical transceiver, where FIG. 3 views the inside of the optical transceiver from the rear bottom.
Figure 4:
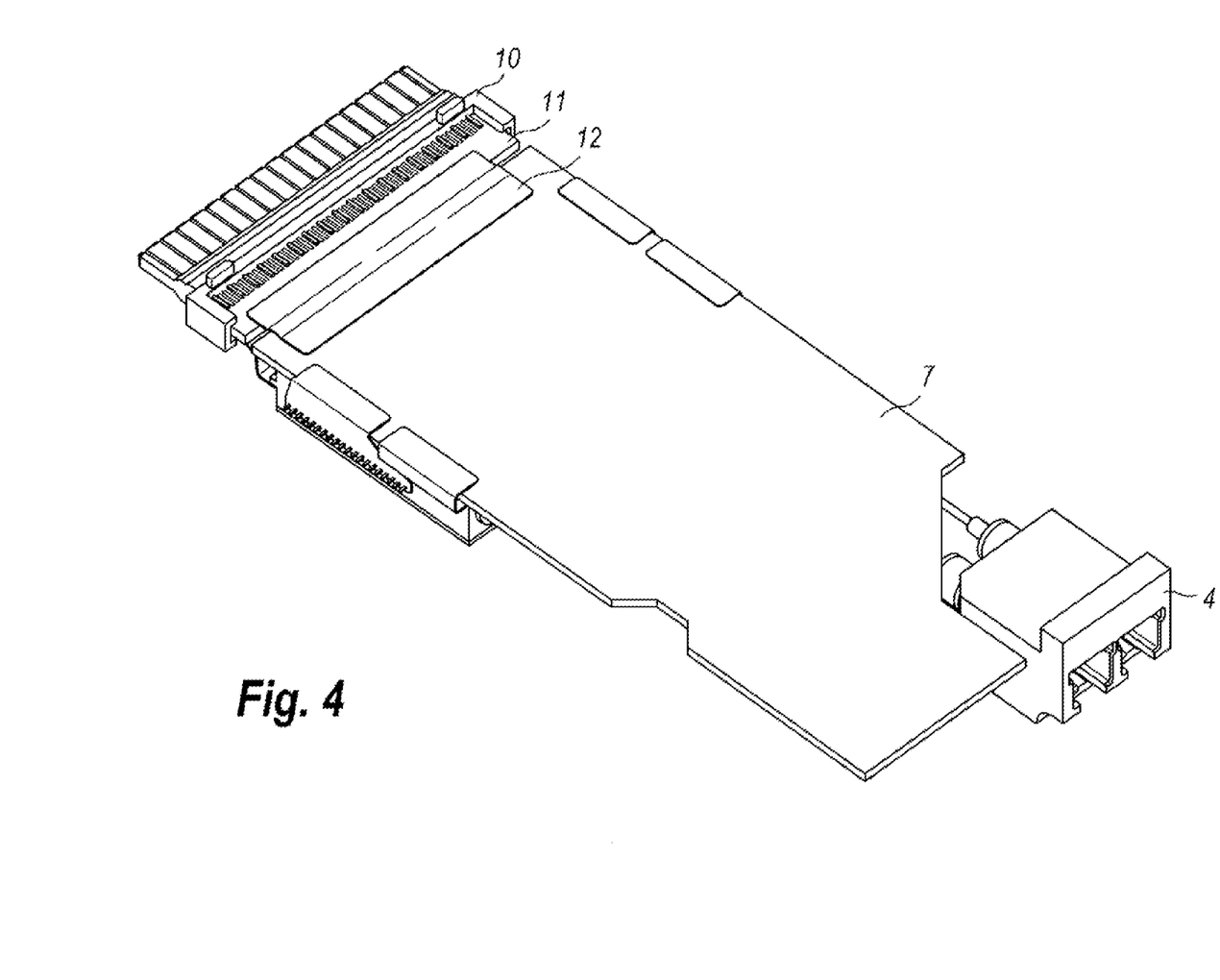
FIG. 4 shows the inside of the optical transceiver viewed from the front top.

FIGS. 2 to 4 shows primary components installed within the inside of the optical transceiver 1, where FIG. 2 views the inside from the front bottom, FIG. 3 views from the rear bottom, and FIG. 4 views from the front top.

As shown in FIG. 2, the optical transceiver 1 provides an optical transmitter optical module 5, an optical receiver optical module 6, and a printed circuit board (PCB) 7. The optical transmitter optical module 5 converts an electrical signal (or electrical signals) into an optical signal (or an optical signal with a plurality of signal wavelengths) and outputs thus converted optical signal. The optical receiver optical module 6 receives an optical signal (or an optical signal with a plurality of signal wavelengths) and converts the optical signal into an electrical signal (or electrical signals) to output to the host system. The transmitter optical module 5 and the receiver optical module 6 install respective transducers and some electronic circuits therein. The PCB 7 mounts circuits to control temperatures of the optical transducers in the optical modules, 5 and 6, and/or, to control wavelengths of the optical signal output from the transmitter optical module 5.

The optical transceiver 1 further installs inner fibers, 8 and 9, each optically coupling the optical receptacle 4 with the transmitter optical module 5 and the optical receptacle 4 with the receiver optical module 6, respectively. Receiving an external optical connecter in the optical receptacle 4, the optical transceiver 1 may perform the full-duplex communication by the transmitter optical module 5 and the receiver optical module 4 through the pair of external fibers.

As described, the optical transceiver 1 provides the electrical plug 10 in the rear end to electrically communicate with the host system. As illustrated in FIG. 4, the electrical plug 10, which is a part of a relay substrate 11, is electrically connected to the PCB 7 through a flexible printed circuit (FPC) board 12, but the relay substrate 11 may be rigidly connected with the PCB 7, or may be a part of the PCB 7. The electrical plug 10 is exposed from the housing 1 when the top and bottom housings, 2 and 3, are assembled to each other.

Figure 5:
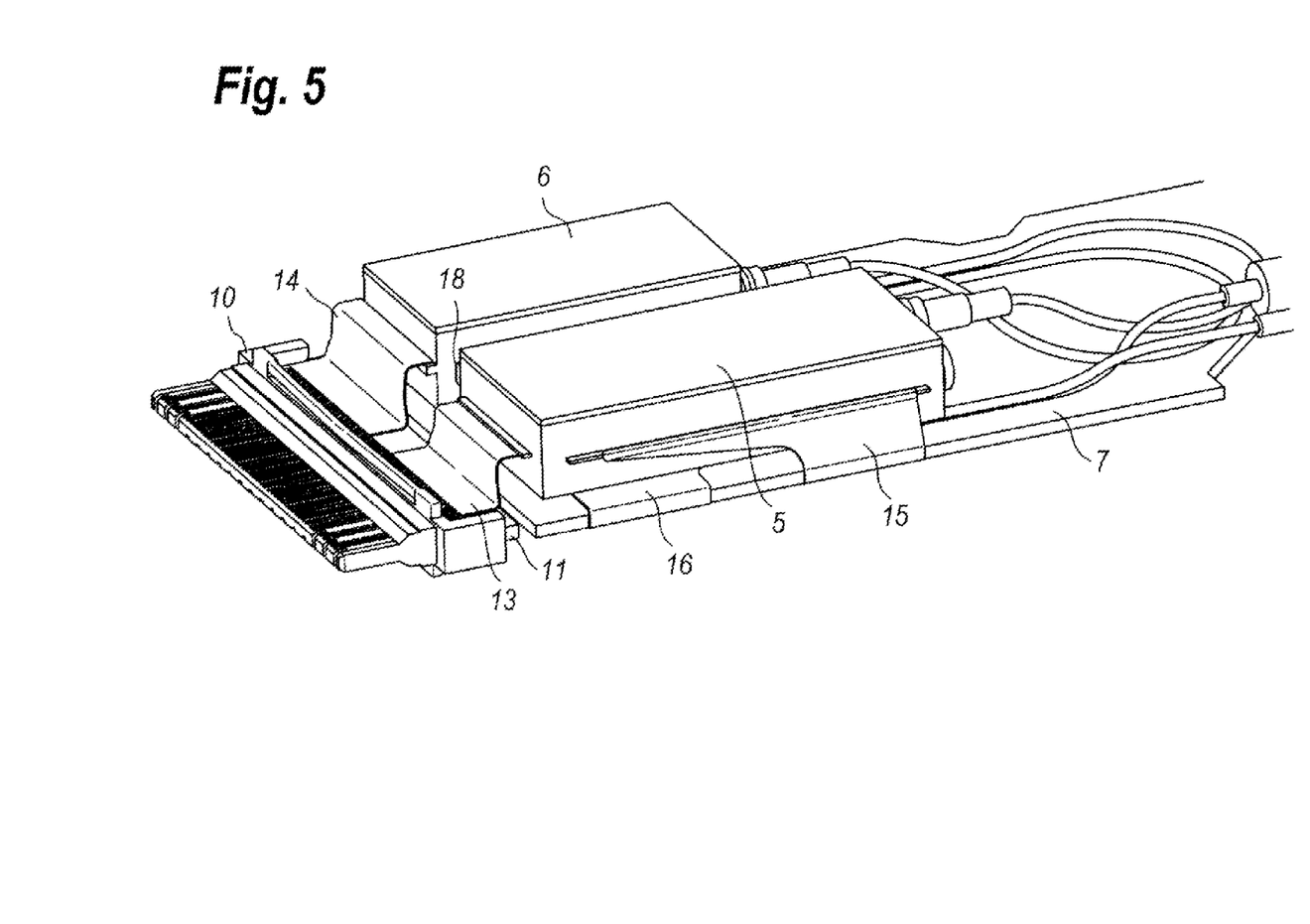
FIG. 5 magnifies the rear portion of the inside of the optical transceiver.
Figure 6:
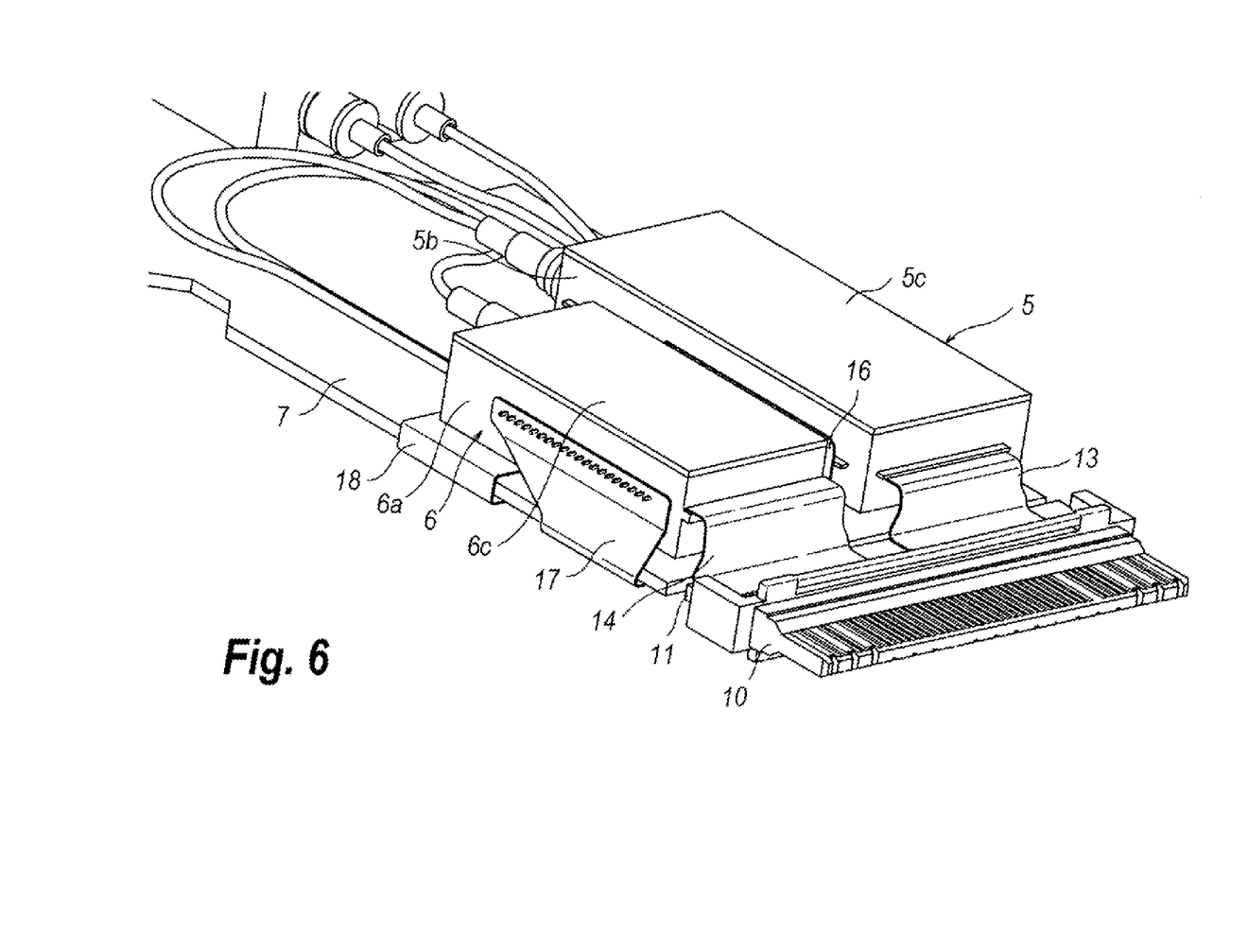
FIG. 6 magnifies the rear portion of the inside of the optical transceiver, which is viewed from the rear bottom.

FIGS. 5 and 6 magnify the rear portion of the inside of the optical transceiver 1, where FIG. 5 views the rear portion from a side of the transmitter optical module 5; while, FIG. 6 views the rear portion from another side, namely, in the side of the receiver optical module 6. The transmitter optical module 5 and the receiver optical module 6 are electrically connected directly to the relay substrate 11 by respective FPCs, 13 and 14, without interposing the PCB 7.

The transmitter optical module 5 is electrically connected to the circuit on the PCB 7 through FPCs, 15 and 16, provided in respective side walls. Similarly, the receiver optical module 6 is electrically connected to another circuit on the PCB 7 through FPCs, 17 and 18, provided in respective side walls thereof. The FPCs, 15 to 18, may transmit signals containing low frequencies (LF), or substantially DC signals. While, the FPCs, 13 and 14, carry signals containing high frequencies directly to the relay substrate 11 or the electrical plug 10 without passing the PCB 7.

Figure 7:
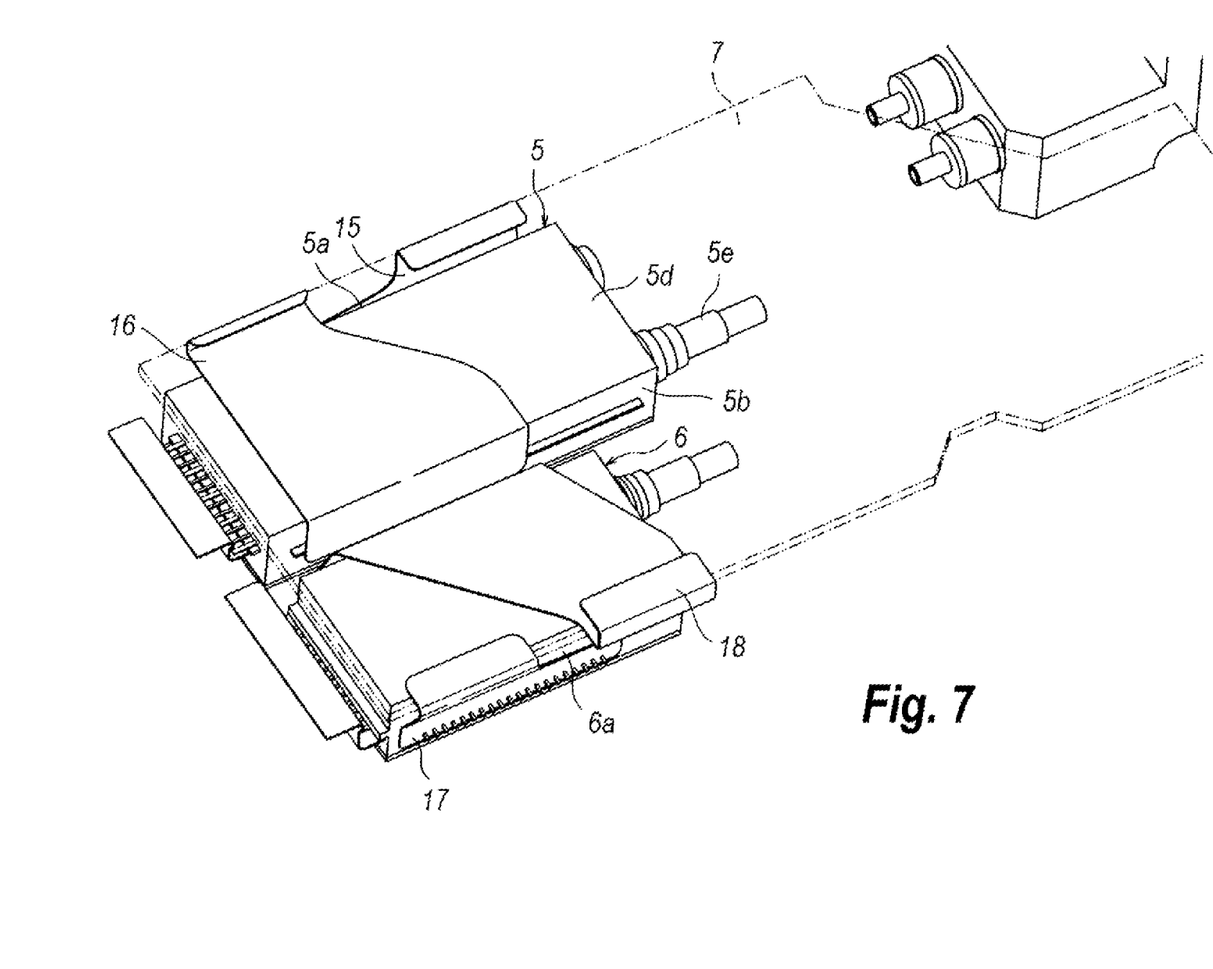
FIG. 7 shows FPCs extended from respective side walls of the optical modules and connected to the top surface of the PCB.
Figure 8:
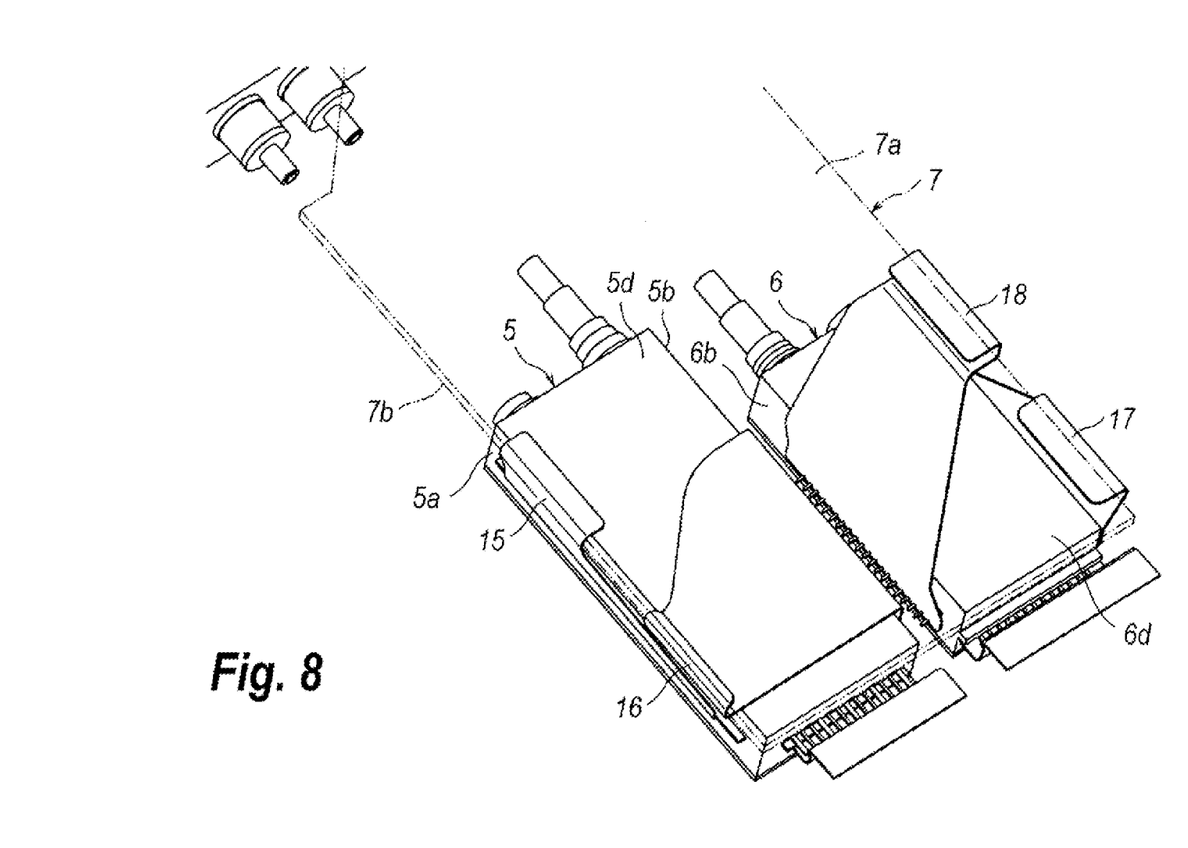
FIG. 8 also shows the FPCs, which is viewed from the rear top of the optical transceiver.

Next, details of the arrangements of the FPCs, 15 to 18, are descried as referring to FIGS. 7 and 8. FIGS. 7 and 8 view the inside of the optical transceiver 1 from the rear top, where FIG. 7 views from the side of the receiver optical module 6, while, FIG. 8 views from the other side of the transmitter optical module 5. Also, FIGS. 7 and 8 transparently illustrate the PCB 7 by two-dot chain lines, and omit the inner fibers, 8 and 9, the electrical plug 10, and so on.

The FPCs, 15 to 18, for LF signals and DC signals are connected to the PCB 7 as follows: the first FPC 15 connected in one end thereof to the side wall 5a, namely, the peripheral side wall, of the transmitter optical module 5, where the side wall 5a faces one of sides of the optical transceiver 1, is pulled out upwardly without forming any bends, extends at the side of the PCB 7, bent by about 90° toward the top surface 7a of the PCB 7, and the other end of the FPC 15, namely, a tip of the bent portion, is fixed or soldered to the top surface 7a of the PCB 7. The end of the first FPC 15 connected to the side wall 5a of the transmitter optical module 5 extends in whole longitudinal length thereof. While, at the side of the FPC 7, the FPC 15 narrows the width thereof as narrowing spans between interconnections provided on the FPC 15 to be concentrated in a front portion, and soldered or fixed to the FPC 7 only in the front portion of the FPC 15.

The other FPC 16, namely the second FPC, connected to terminals provided in another side wall 5b, namely, the center side wall close to the longitudinal center of the housing 11, is extended upwardly along the center side wall 5b, bent by about 90°, extended in a space formed between the ceiling 5d of the transmitter optical module 5 and the bottom surface 7b of the PCB 7 to the peripheral side wall 5a, bent again by about 90° upwardly, extends along the edge of the PCB 7, bent again so as to be wrap around the edge of the PCB 7 to be soldered or fixed to the top surface 7a of the PCB 7. The last two bent for the PCB 16 forms a U-shape as putting the PCB 7 therebetween. The connection between the FPC 16 and the terminals in the center side wall 5b is performed along the whole longitudinal length of the transmitter optical module 5 as those of the other FPC 15. However, the connection to the PCB 7 is performed only in the rear portion. That is, the interconnections provided on the FPC 16 and connected to the terminals in the center side wall 5b are concentrated in the rear portion in the other end opposite to that connected to the transmitter optical module 5.

In the receiver optical module 6, one of FPCs 17, namely, the third FPC 17 is connected to the PCB 7 with a shape similar to that of the first FPC 15. Specifically, the FPC 17 is extended upward from the DC/LF terminals provided in the peripheral side wall 6a of the receiver optical module 6, then bent inward by an angle of about 90°, and soldered to the top surface 7a of the PCB 7. The FPC 17 is electrically connected to all DC/LF terminals provided in the peripheral side wall 6a in one end thereof, while, all interconnections on the FPC 17 are collected in a rear portion of the PCB 7. This arrangement of the FPC 17 is just similar to the arrangement of the first FPC 15.

The fourth FPC 18 is connected in one end thereof to whole DC/LF terminals provided in the center side wall 6b in a center portion of the optical transceiver 1, then extended upward, bent at the corner of the receiver optical module 6, extended within a space formed between the ceiling 6d of the receiver optical module 6 and the PCB 7, folded so as to be wraparound the edge of the PCB 7 to form a U-shaped cross section, and finally soldered in the other end thereof to the top surface 7a of the PCB 7. Similar to the first FPC 15, the connection to the PCB 7 is carried out only in the front side of the receiver optical module 6.

Thus, the first and fourth FPCs, 15 and 18, are soldered with the PCB 7 in the frond sides of respective modules, 5 and 6; while, the second and third FPCs, 16 and 17, are soldered with the PCB 7 in the rear sides of respective modules, 5 and 6. Accordingly, two FPCs, 15 and 16, and another two FPCs, 17 and 18, are not interfered. Moreover, two FPCs, 16 and 18, extend from the center portion to respective peripheral sides of the transceiver along the space 20 formed between the modules, 5 and 6, and the bottom surface 7b of the PCB 7. The FPCs, 16 and 18, preferably extend along the modules, 5 and 6, so as to form the space 20 between the FPCs, 16 and 18, and the PCB 7. When the space 20 is formed between the FPCs, 16 and 18, and the ceilings, 5d and 6d, of respective modules, 5 and 6, the space 20 is partitioned in the center of the optical transceiver 1 by the FPCs, 16 and 18, extending upward from the center side walls, 5b and 6b. The FPCs, 16 and 18, form barriers for the inner fibers, 8 and 9, to distribute within the optical transceiver 1.

Figure 9:
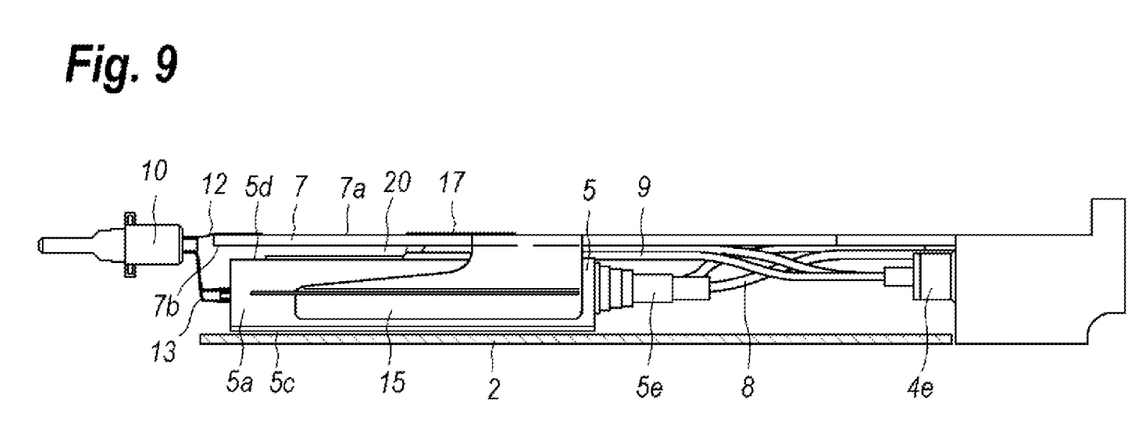
FIG. 9 is a side view of the optical transceiver to explain vertical relation of the PCB, the optical modules, and the bottom cover.

FIG. 9 is a side view showing the positional relation between the transmitter optical module 5 and the PCB 7. As described, the modules, 5 and 6, form the space 20 against the PCB 7. The inner fibers, 8 and 9, may be extended within the space 20 to facilitate the assembly of the optical transceiver.

Various techniques are known for setting the transmitter and receiver optical modules, 5 and 6, above the PCB 7 as forming the space 20 therebetween. For instance, the following four techniques are considered:

(1) The transmitter and receiver optical modules, 5 and 6, are secured only by FPCs using the elasticity inherently attributed to an FPC. This technique has a cost merit to exclude components specific to hold the modules; however, the FPCs to be applicable thereto are so restricted in the point of the stiffness. The FPC is inevitably requested to show the stiffness, which is determined by dimensions thereof, namely thickness and width, and the Young's modulus, enough to hold the modules, 5 and 6. When the transmitter and/or receiver optical modules has large dimensions, or weighty; or the FPC is necessary to be lengthened, this techniques is quite hard to be practically accepted.

(2) A Technique to Use an FPC Implementing a Thicker Portion

In this technique, an FPC has a portion showing a function of a spacer. For instance, the FPC provides the portion with a thickness corresponding to the gap of the space 20 in a surface facing the ceiling, 5d or 6d, of the module, 5 or 6. Or, the FPC has a tab in respective corners of the module, 5 and 6. The tab has a U-shaped cross section with a space corresponding to the gap of the space 20. The thicker portion or the tab may form the gap.

(3) A Technique to Put a Spacer Between the PCB 7 and the modules, 5 and 6.

The transmitter and receiver optical modules, 5 and 6, provide spacers at positions exposed from the FPCs, 16 and 18, of respective ceilings, 5d and 6d. The height of the spacer corresponds to the gap of the space 20. The spacer preferably is in contact with the back surface 7b of the PCB 7. Because the PCB 7 is mounted within the optical transceiver 1 as the top surface 7a thereof upward; the spacer provided in the back surface 7b of the PCB is necessary not to be detached from the PCB 7 when the optical transceiver 1, or an intermediate assembly including the PCB 7 and the modules, 5 and 6, are held in upside-down.

(4) Forming Structures to Mount PCB 7 in Bottom Housing 2

The PCB 7 of the present embodiment is assembled with the bottom housing 2, which mounts the transmitter optical module 5 and a receiver optical module 6, so as to cover the ceilings, 5d and 6d, of the modules, 5 and 6. Forming structures, for instance, steps in the inside of the bottom housing 2 to mount the PCB 7 thereon, the space may be easily formed between the substrate 7 and two modules, 5 and 6.

The transmitter optical module 5 and the receiver optical module 6 generally show large power consumption, which means the modules, 5 and 6, generates large heat and the heat dissipation is inevitable for the modules, 5 and 6. Especially, a semiconductor laser diode (LD) installed in the transmitter optical module 5 generally shows large temperature dependence for various parameters. The arrangement of the present embodiment, that is, the surfaces, 5c and 6c, opposite to respective ceilings, 5d and 6d, are securely in contact to the bottom housing 2, ensures the heat dissipating path from the modules, 5 and 6, to the housing 1 without interfering the distribution of the inner fibers, 8 and 9.

Figure 10:
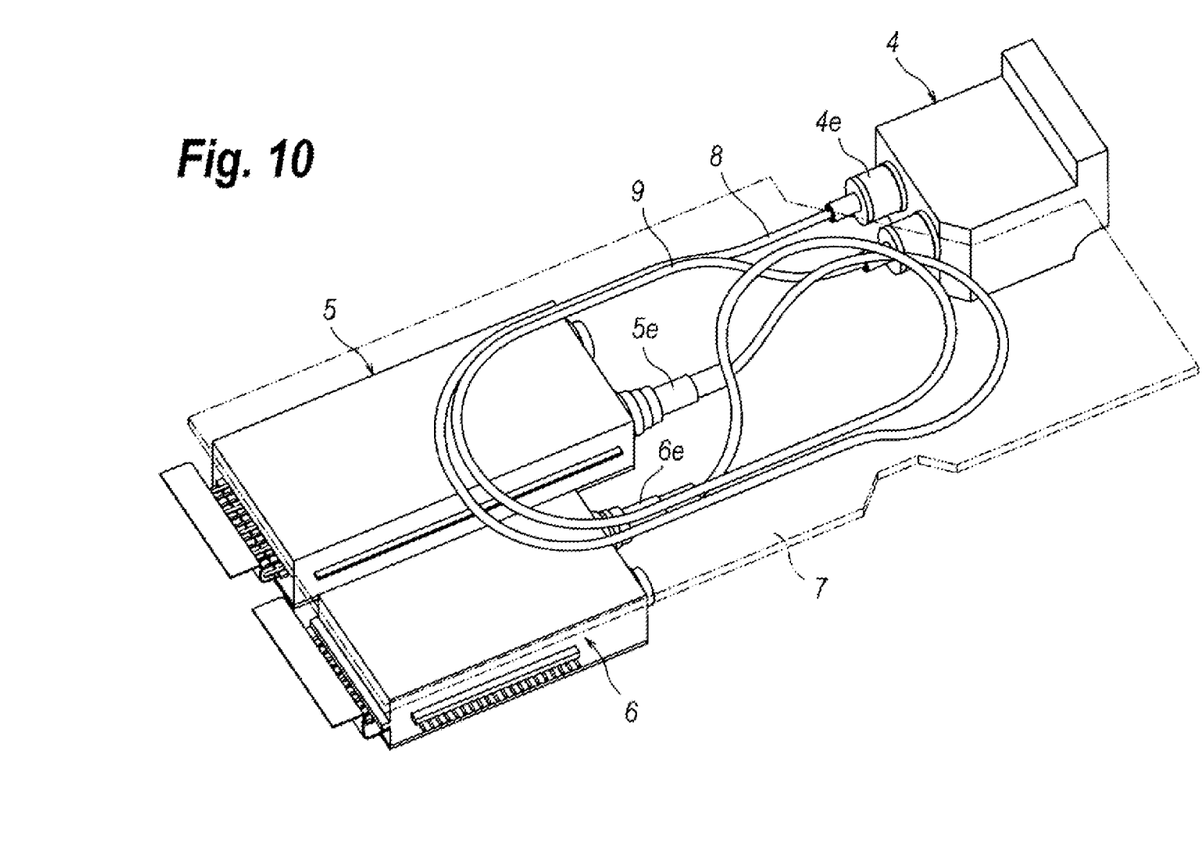
FIG. 10 shows the disposition of the inner fibers in the optical transceiver.

FIG. 10 is a perspective view of the inside of the optical transceiver 1, in particular, FIG. 10 shows a distribution of the inner fibers, 8 and 9, within the housing 1. FIG. 10 virtually indicates the PCB 7 by the two-dot chained line. An ordinary fiber is necessary to be bent with a radius smaller than, for instance, 15 mm to ensure the bent loss and the reliability thereof. Accordingly, an optical transceiver like the present embodiment, where the inner fiber has an excess length to ensure the bent loss, is necessary to securely distribute the inner fiber with the excess length within the housing 1.

The optical transceiver 1 of the embodiment forms the space with a substantial gap between the optical modules, 5 and 6, and the PCB 7; and the inner fibers, 8 and 9, are set within the space. The gap is preferably at least twice as a diameter of the inner fiber, 8 and 9. Even when the inner fibers, 8 and 9, cross within the space, the PCB 7 or the optical modules, 5 and 6, do not cause a stress to the inner fibers, 8 and 9.

Next, a method to assemble the optical transceiver of an example of the present application will be described.

First, in advance to install the transmitter and receiver optical modules, 5 and 6, these modules, 5 and 6, are connected with the optical receptacle 4 by inner fibers, 8 and 9. The inner fibers, 8 and 9, assemble temporal ferrules in both ends thereof, while, the optical receptacle 4 and the transmitter and receiver optical modules, 5 and 6, secure temporal sleeves in respective input ports. Inserting the temporal ferrules of the inner fibers, 8 and 9, into respective sleeves, the transmitter and receiver modules, 5 and 6, may be optically coupled with the optical receptacle 4.

Then, the transmitter and receiver optical modules, 5 and 6, assemble with respective FPCs, 15 to 18, for the DC/LF signals and other FPCs, 13 and 14, for the RF signals. However, steps to connect the inner fibers, 8 and 9, to assemble the FPCs, 15 to 18, and to assemble other FPCs, 13 and 14, are not restricted to be carried out in the order above described. Three steps are optionally performed.

Next, an intermediate assemble above descried, which includes the transmitter and receiver optical modules, 5 and 6, assembled with the inner fibers, 8 and 9, the optical receptacle 4, and the relay substrate 10, is to be set on the bottom housing 2. Putting gels between the bottom surface, 5c and 6c, of the transmitter and receiver optical modules, 5 and 6, and the bottom housing 2, the heat dissipation from the modules, 5 and 6, to the bottom housing 2 may be enhanced.

Then, the inner fibers, 8 and 9, in excess portions thereof are set above the transmitter and receiver optical modules, 5 and 6, so as not to bend them shorter than the specified minimum bending radius thereof. Specifically, the inner fiber 8, which is pulled out from one of the temporal sleeve of the optical receptacle 4, is extended linearly to the rear of the optical transceiver 1, and extended toward the front of the optical transceiver 1 by bending in the rear portion so as to form a U-character. Then, turning again by substantially 180° in the front, the inner fiber 8 is headed to the temporal sleeve 5e of the transmitter optical module 5.

The other inner fiber 9, which is pulled out from the other sleeve 4e of the optical receptacle 4, is bundled with the inner fiber 8 in a way to the transmitter optical module 5, bent by 180° in the rear accompanied with the inner fiber 8, headed to the front, bent again by 180° in the front, exactly in a side of the optical receptacle 4, and headed to the temporal sleeve 6e of the receiver optical module 6 as drawing an S-character.

The inner fibers, 8 and 9, bent by about 180° so as to cross two modules, 5 and 6, above the ceilings, 5d and 6d, thereof. Moreover, the inner fibers, 8 and 9, are extended above the second and fourth FPCs, 16 and 18. During the process to extend the inner fibers, 8 and 9, the FPCs, 15 to 18, are not connected in one ends thereof to the PCB 7. Thus, in the process to extend the inner fibers, 8 and 9, the second and fourth FPCs, 16 and 18, do not interfere with the wiring of the inner fibers, 8 and 9.

The process next installs the PCB 7 within the housing 2 as slightly pushing the inner fibers, 8 and 9, downward. The lower housing 2 preferably provides structures to set the PCB 7. For instance, the PCB 7 is preferably and stably set on a step formed in the inside of the lower housing 2. The lower housing 2 may further implement a structure to assemble the relay substrate 10. The process then solders one ends of the FPCs, 15 to 18, with pads prepared on the top surface 7a of the PCB 7; the RF FPCs, 13 and 14, extended from respective rear walls of the modules, 5 and 6, with the pads in the back surface of the relay substrate 10; and the pads provided in a rear end of the top surface 7a of the PCB 7 with the pads provided in the top surface of the relay substrate 10. Finally, the upper housing 3 is assembled with the lower housing 2. Thus, the process to assemble the optical transceiver 1 is completed.

The process thus described concentrates on the arrangement where the second and fourth FPCs, 16 and 18, form the gap 20 against the PCB 7, and the inner fibers, 8 and 9, are extended in the gap 20. However, as already described, the gap 20 may be formed between the ceilings, 5d and 6d, of the modules, 5 and 6, and the second and fourth FPCs, 16 and 18. In the latter arrangement, the gap 20 is divided into two spaces along the center sides, 5b and 6b, of the modules, 5 and 6, by the second and fourth FPCs, 16 and 18. However, the second and fourth FPCs, 16 and 18, do not extend in the rear of the two modules, 5 and 6. The inner fibers, 8 and 9, may extend from one side to the other side in this rear portion to turn almost about 180°.

Moreover, in the latter arrangement where the inner fibers, 8 and 9, extend between the ceilings, 5d and 6d, and the second and fourth FPCs, 16 and 18; the second and fourth FPCs, 16 and 18, may temporarily push the inner fibers, 8 and 9, downward. In the former arrangement where the gap 20 is provided between two FPCs, 16 and 18, and the PCB 7; the inner fibers, 8 and 9, wiggle until the PCB 7 is set in the bottom housing 2. The second and fourth FPCs, 16 and 18, temporarily set the inner fibers, 8 and 9.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An optical transceiver, comprising:
    an optical receptacle to receive an external optical connector that secures an external fiber;
    a transmitter optical module and a receiver optical module each installing respective a optical devices for converting between an optical signal and an electrical signal;
    an inner fiber configured to couple at least one of the optical devices optically with the external fiber; and
    a printed circuit board (PCB) that mounts an electronic circuit electrically coupled with the transmitter optical module and the receiver optical module, the PCB forming a space between the PCB and at least one of the transmitter optical module and the receiver optical module,
    wherein at least one of the transmitter optical module and the receiver optical module provides a flexible printed circuit (FPC) board and a ceiling, the FPC board being connected to the PCB, the ceiling facing the PCB,
    wherein the FPC board is extended along the ceiling, wrapped around an edge of the PCB, and connected to a surface of the PCB opposite to a surface facing the ceiling of the at least one of the transmitter optical module and the receiver optical module,
    wherein the space is formed between the FPC board and the PCB, and
    wherein the inner fiber extends within the space.

2. The optical transceiver of claim 1,
    further comprising a housing that installs the optical receptacle, the transmitter optical module, the receiver optical module, the PCB, and the inner fiber therein,
    wherein the at least one of the transmitter optical module and the receiver optical module providing the FPC board further includes a bottom surface opposite to the ceiling, the bottom surface being in direct contact with the housing.

3. The optical transceiver of claim 1,
    further comprising an electrical plug and a relay substrate electrically connected with the PCB and an FPC board,
    wherein the at least one of the transmitter optical module and the receiver optical module further includes another FPC board directly connected to the relay substrate for transmitting high frequency signals.

4. An optical transceiver comprising:
    an optical receptacle to receive an external optical connector that secures an external fiber;
    a transmitter optical module and a receiver optical module each installing respective optical devices for converting between an optical signal and an electrical signal;
    an inner fiber configured to couple at least one of the optical devices optically with the external fiber; and
    a printed circuit board (PCB) that mounts an electronic circuit electrically coupled with the transmitter optical module and the receiver optical module, the PCB forming a space between the PCB and at least one of the transmitter optical module and the receiver optical module,
    wherein at least one of the transmitter optical module and the receiver optical module provides a flexible printed circuit (FPC) board and a ceiling, the FPC board being connected to the PCB, the ceiling facing the PCB,
    wherein the FPC board is extended along the ceiling, wrapped around an edge of the PCB, and connected to a surface of the PCB opposite to a surface facing the ceiling of the at least one of the transmitter optical module and the receiver optical module, and
    wherein the space is formed between the FPC board and the ceiling of the at least one of the transmitter optical module and the receiver optical module.

5. The optical transceiver of claim 4,
    further comprising an electrical plug and a relay substrate electrically connected with the PCB and an FPC board,
    wherein the at least one of the transmitter optical module and the receiver optical module further includes another FPC board directly connected to the relay substrate for transmitting high frequency signals.

6. An optical transceiver that performs a full-duplex optical communication, comprising:
    an optical receptacle configured to receive an optical connecter that secures a pair of external fibers,
    a transmitter optical module configured to transmit a transmitting optical signal to one of the external fibers;
    a receiver optical module configured to receive a receiving optical signal from another of the external fibers;
    a first inner fiber and a second inner fiber, the first inner fiber optically coupling one of the external fibers with the transmitter optical module through the optical receptacle, the second inner fiber optically coupling the another of the external fibers with the receiver optical module through the optical receptacle; and a printed circuit board (PCB) configured to be coupled with the transmitter optical module and the receiver optical module, wherein the transmitter optical module and the receiver optical module are set in a side by side arrangement in the optical transceiver, wherein the first inner fiber and the second inner fiber are wired in a space formed between the PCB and the transmitter optical module and the receiver optical module, wherein the transmitter optical module and the receiver optical module each has a center side wall and a peripheral side wall, each of the center side wall and the peripheral side wall providing respective flexible printed circuit (FPC) boards electrically connected to the PCB, and wherein the space is formed between the PCB and the FPC boards each connected to the center side walls of respective optical modules.

7. The optical transceiver of claim 6, wherein the FPC boards each connected to respective center sides walls are extended along ceilings of the transmitter optical module and the receiver optical module facing the PCB, and wrapped around at respective edges of the PCB, and connected to a top surface of the PCB opposite to a surface facing respective ceilings.

8. The optical transceiver of claim 6, further comprising an electrical plug for transmitting electrical signals externally and a relay substrate electrically connected to the electrical plug, wherein the transmitter optical module and the receiver optical module each further provides respective additional FPC boards in side walls each connecting the respective center side walls and the respective peripheral side walls, the additional FPC boards being directly connected to the relay substrate for transmitting high frequency signals without interposing the PCB.

9. The optical transceiver of claim 6, wherein the first inner fiber and the second inner fiber are extended from one side of the optical transceiver to another side of the optical transceiver at a portion in a rear of the transmitter optical module and the receiver optical module.

10. An optical transceiver that performs a full-duplex optical communication, comprising:

an optical receptacle configured to receive an optical connecter that secures a pair of external fibers, a transmitter optical module configured to transmit a transmitting optical signal to one of the external fibers;

a receiver optical module configured to receive a receiving optical signal from another of the external fibers;

a first inner fiber and a second inner fiber, the first inner fiber optically coupling one of the external fibers with the transmitter optical module through the optical receptacle, the second inner fiber optically coupling the another of the external fibers with the receiver optical module through the optical receptacle; and a printed circuit board (PCB) configured to be coupled with the transmitter optical module and the receiver optical module, wherein the transmitter optical module and the receiver optical module are set in a side by side arrangement in the optical transceiver, wherein the first inner fiber and the second inner fiber are wired in a space formed between the PCB and the transmitter optical module and the receiver optical module, wherein the transmitter optical module and the receiver optical module each has a center side wall and a peripheral side wall, each of the center side wall and the peripheral side wall providing respective flexible printed circuit (FPC) boards electrically connected to the PCB, and wherein the space is formed between respective optical modules and the FPC boards each connected to the center side walls of respective optical modules.

11. The optical transceiver of claim 10, wherein the FPC boards each connected to respective center sides walls are extended along a ceiling of the transmitter optical module and a ceiling of the receiver optical module each facing the PCB, wrapped around at respective edges of the PCB, and connected to a top surface of the PCB opposite to a surface facing the respective ceilings.

12. The optical transceiver of claim 10, wherein the first inner fiber and the second inner fiber are extended from one side of the optical transceiver to another side of the optical transceiver at a portion in a rear of the transmitter optical module and the receiver optical module.

13. The optical transceiver of claim 10, further comprising an electrical plug for transmitting electrical signals externally and a relay substrate electrically connected to the electrical plug, wherein the transmitter optical module and the receiver optical module each further provides respective additional FPC boards in side walls each connecting the respective center side walls and the respective peripheral side walls, the additional FPC boards being directly connected to the relay substrate for transmitting high frequency signals without interposing the PCB.

* * * * *